Sept. 11, 1951        J. D. RYAN        2,567,353

LAMINATED SAFETY GLASS

Filed June 13, 1947

Inventor
Joseph D. Ryan
Nobbe & Swope
Attorneys

UNITED STATES PATENT OFFICE 2,567,353

LAMINATED SAFETY GLASS

Joseph D. Ryan, Toledo, Ohio, assignor to Libbey-Owens-Ford Glass Company, Toledo, Ohio, a corporation of Ohio Application June 13, 1947, Serial No. 754,355

2 Claims. (Cl. 154—2.77)

The present invention relates to laminated safety glass. More particularly, it has to do with laminated safety glass in which the plastic interlayer extends beyond the edges of the glass sheets to provide a flexible mounting and sealing flange, and contemplates a special type of interlayer for such structure.

Generally speaking, units of this general type consist of two or more transparent panels, which may be sheets of glass, or other relatively hard transparent material, and an interposed layer or layers of a softer thermoplastic material, all bonded together under heat and pressure to form a composite whole. The plastic interlayer is of sufficient area to extend outwardly beyond the edges of the glass sheets and form a plastic flange, which can be clamped between the opposite members of the frame of a window or sight opening in a manner to seal the opening and to provide a flexible or "floating" mounting for the outer transparent panels of the unit.

Although usable for any one of a number of different purposes, this type of glazing unit is especially well adapted for glazing the sight openings of aircraft, where protective requirements are unusually stringent and where a flexible type of window mounting is especially desirable.

When such extended plastic type of unit is mounted in the window of an airplane, the plastic attaching flange will provide a sort of sealing gasket which, when clamped in the window frame, will completely and effectively seal the window opening. This feature is particularly important in pressurized cabins and in high altitude or stratosphere flying.

At the same time, the flexible attaching or mounting flange will afford a certain resiliency or freedom of movement of the glass-plastic structure relative to the supporting frame in which it is mounted. In this way, the torsion and shock to which the aircraft is normally subjected will be cushioned and not transmitted directly to the glass, with the result that the tendency of the glazing unit to be cracked or shattered from such causes will be greatly reduced if not entirely eliminated. Moreover, the twisting and weaving, and the varying pressure differentials to which a plane is subjected, will not be as apt to break the glass of a unit mounted in this manner, because of the ability of the unit to "float" in its mounting, without the introduction of localized strains.

Another advantage of these units is that they can be flush mounted in the 'plane so that they fit into the streamlined outer surfaces and cut down wind resistance.

These general advantages may be said to be present in all of the conventional forms of extended plastic, laminated safety glass. But difficulties have been experienced in arriving at the proper type of plastic interlayer to give a unit that will be completely satisfactory under all possible conditions, especially in cases where these units are called upon to perform services at extremely low temperatures. For instance, plastic interlayers of a softness suitable for general automotive work are so soft as to be unsuitable for extended plastic laminations under severe strain conditions, because of their high extensibility and insufficient tensile strength. This is because a highly extensible plastic attaching flange leads to excessive bellows action when mounted in a plane, resulting in failure of the unit, particularly in pressurized cabins.

On the other hand, the use of plastic interlayers that are hard enough to give the necessary tensile strength and resistence to bellows action, when used at very low temperatures, for example at.—75° Fahrenheit which is specified for B-29 closures, results in the spalling of the glass in the unit. This spalling of the glass generally occurs around the edges of the lamination and in many cases extends well into the vision area with consequent obscuring of vision and weakening of the glazing structure.

Now I have discovered that these objectionable features can be overcome by the provision of an extended plastic type of laminated safety glass unit in which the plastic interlayer is composed of a novel combination of hard and soft plastic material.

Broadly stated, it is the primary aim of the present invention to provide a new kind of extended plastic type laminated safety glass unit which will be stable over an extremely wide range of temperatures; which will have low extensibility under load, and high tensile strength over the entire range; and in which the glass will not spall even at temperatures of —75° Fahrenheit and lower.

A more specific object is the provision of an extended plastic type of laminated glass in which the plastic interlayer is made up of a relatively thick central core of a relatively hard rlastic faced with thinner layers of a relatively soft plastic.

Still another object is to provide an extended plastic unit of this character in which there is no bead or collar of plastic around the edges of the glass sheets.

Other objects and advantages of the invention will become more apparent during the course of the following description, when taken in connection with the accompanying drawings.

In the drawings, wherein like numerals are employed to designate like parts throughout the same:

Figure 1:
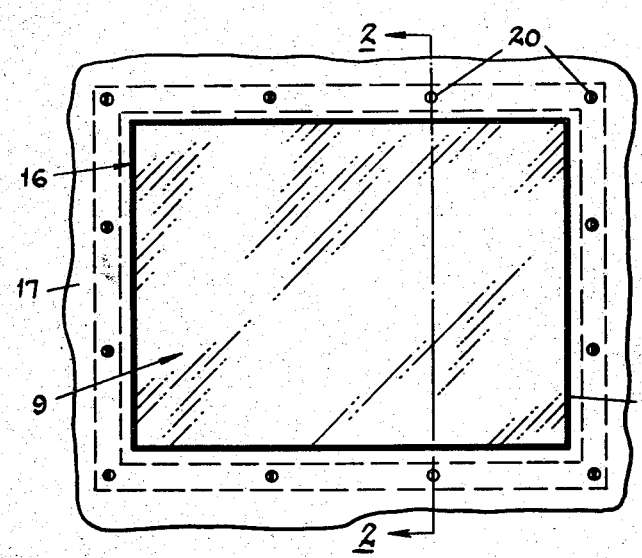
Fig. 1 is a fragmentary view of the side of an airplane showing a sight opening glazed with the extended plastic type laminated safety glass unit of this invention.

Referring now more particularly to the drawings, the laminated structure 9 shown there includes two sheets of glass 10 and 11, and an interposed central sheet of thermoplastic material designated in its entirety by the numeral 12, all bonded together into a unitary structure.

The glass sheets 10 and 11 may be of ordinary plate or sheet glass, or may be fully or semi-tempered glass, or any combination of known types of glass sheets or plates. The central sheet 12 is preferably made up of a thick central core of relatively hard plastic 13, and two thinner layers of relatively soft plastic 14. The several strata of the plastic central sheet may be formed of a polyvinyl acetal resin, for example, polyvinyl butyral resin plasticized with a suitable plasticizer such as dibutyl sebacate, triethylene glycol dihexoate or triethylene glycol ester of the fatty acids from cocoanut oil ranging in carbon content from $C_6$ to $C_8$.

Excellent results are obtained when the central core 13 is polyvinyl butyral plasticized with 21 parts plasticizer per 100 parts of the resin by weight, and the facing layers 14 are polyvinyl butyral plasticized with 37½ parts plasticizer per 100 parts of the resin by weight.

Figure 2:
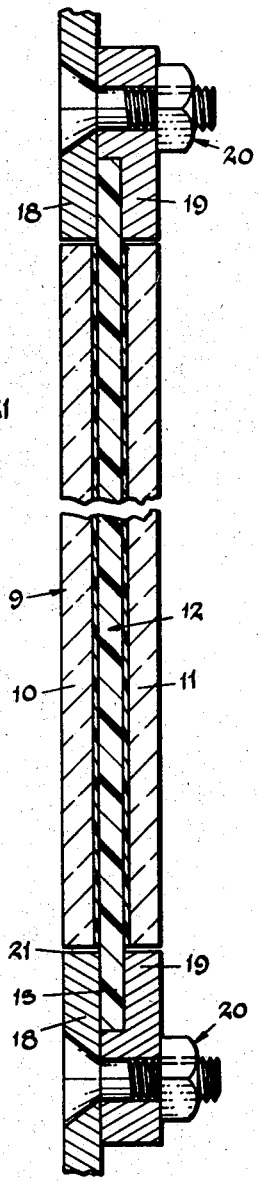
Fig. 2 is a section taken substantially along the line 2—2 in Fig. 1.
Figure 3:
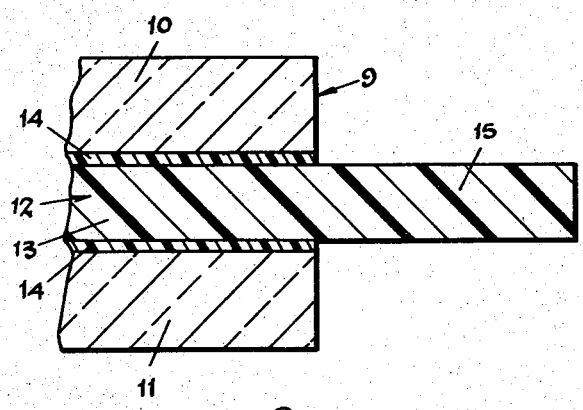
Fig. 3 is an enlarged fragmentary sectional view of one side of the unit of Fig. 2.

As can be plainly seen in Figs. 2 and 3, in producing the safety glass units, a central plastic sheet 12 is employed that is of larger area than the glass sheets so that in the finished unit the plastic interlayer extends outwardly beyond the glass sheets at all four edges to provide the plastic attaching flange 15. By means of this flange, the laminated glazing unit 9 can be flexibly but permanently mounted in a sight opening 16 of an aircraft 17.

This can be done, for example, by clamping the extended plastic attaching flange 15 between the skin 18 of the ship, forming one side of the window frame, and a collar or movable frame portion 19, with machine screws or the like 20. The glass sheets 10 and 11 are preferably spaced slightly from the frame as at 21 to allow the glass portion of the unit to "float" in the frame within the limits of the flexibility of the attaching flange.

Figure 4:
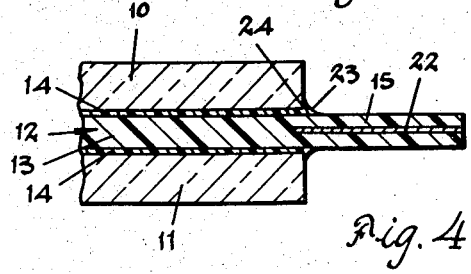
Fig. 4 is a view similar to Fig. 3, showing the objectionable plastic bead or collar that may sometimes be found during production of the unit, and a metal reinforcing member in the plastic interlayer.

In the unit shown in Figs. 2 and 3, the extended plastic flange 15 is used without reinforcement of any kind. However, when desired, a metal reinforcing member, shown at 22 in Fig. 4, may be employed. This reinforcing member is preferably in the form of an aluminum or other metal collar or frame, about .020 to .030 of an inch thick, that is embedded in the plastic interlayer around the marginal portions thereof. Formerly, it was believed that such reinforcing means contributed to the difficulties that were had with spalling of the glass at low temperatures. But with the special laminated plastic interlayer of this invention, the metal reinforcing inserts can be used whenever desired without bad effect.

Another important feature of the invention lies in the fact that no part of the plastic interlayer is permitted to adhere to the edges of the glass. In manufacturing these units, the several laminations are assembled together in proper superimposed relationship and then prepressed under relatively slight heat and light pressure to remove air from between the laminations and to cause them to adhere to one another. The prepressing is generally carried out either by placing the assemblies in a plastic bag and exhausting the air from the bag or by pressing the assembled laminations between the platens of a press. This prepressing is then followed by a final pressing or compositing, usually in an oil autoclave at around 50 pounds pressure per square inch and a temperature of around 250° Fahrenheit.

During these preliminary and final pressing treatments the thermoplastic interlayer may flow, or be pressed, outwardly from between the glass sheets to form a plastic bead, collar or fillet, illustrated at 23 in Fig. 3, which adheres tightly to the edges of the glass at 24. I have discovered that, if this plastic fillet is allowed to remain, it becomes a major contributing factor to spalling of the glass edges when the unit is put into use at low temperatures.

This is probably due to the fact that the adhesive forces set up between the overlying plastic and the glass edges are very high, and the difference in the coefficient of expansion between the glass and plastic is such that the plastic shrinks in the cold approximately ten times as fast as does the glass. Consequently, at extremely low temperatures, the plastic fillet 24 will literally pull pieces off of the edges of the glass sheets and so disfigure the unit by this glass spalling.

In my construction, I overcome this condition either by routing out and removing the plastic fillet 24 after the unit is composited, or by confining the plastic interlayer during the pressure treatment so that it will be unable to flow out from between the glass sheets or into contact with the glass edges.

Some variation in the thickness of the several layers of the central plastic sheet 12 is permissible depending on the type of installation in which it is to be employed and the load to be carried, but a typical recommended structure which has proved very satisfactory in the glazing of B-29's is as follows:

Layer of glass.
.015" thick layer of 37½ parts plasticized polyvinyl butyral resin extending just over the glass area.
.095" thick layer of 21 parts plasticized polyvinyl butyral resin extending over the entire glass area and beyond to form the supporting edge with or without the metal insert.
.015" thick layer of 37½ parts plasticized polyvinyl butyral resin extending just over the glass area.
Layer of glass.

The relatively thin layers 14 of the central plastic sheet 12 may be of sufficient area to extend outwardly from the glass sheets and completely cover the central core 13 if desired. But in most cases I prefer to employ this softer plastic only within the area of the glass as shown, since the use of the more highly plasticized material on the extended flange 15 tends to increase its tackiness, which is disadvantageous.

Extended plastic, laminated safety glass units of the character shown and described here, and constructed in the manner outlined can be used in such extreme conditions as in glazing high altitude planes, or observation openings in refrigerated wind tunnels, where temperature ranges from approximately −80° Fahrenheit to +150° Fahrenheit may be encountered, and these units will not only remain perfectly stable but will adequately resist glass spalling.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A laminated unit, comprising two sheets of glass and an interposed sheet of thermoplastic material bonded thereto to provide a unitary structure, said interposed sheet comprising a .095 inch thick layer of polyvinyl butyral resin plasticized with approximately 21 parts plasticizer per 100 parts resin by weight and two facing layers of .015 inch thick polyvinyl butyral resin plasticized with 37½ parts of plasticizer per 100 parts resin by weight, said .095 inch thick layer being of sufficient area to have portions thereof extending outwardly from between the transparent panels to provide a flexible attaching flange for the unit.

2. A laminated unit, comprising two sheets of glass and an interposed sheet of thermoplastic material bonded thereto to provide a unitary structure, said interposed sheet comprising a .095 inch thick layer of polyvinyl butyral resin plasticized with approximately 21 parts plasticizer per 100 parts resin by weight and two facing layers of .015 inch thick polyvinyl butyral resin plasticized with 37½ parts of plasticizer per 100 parts resin by weight, said .095 inch thick layer being of sufficient area to have portions thereof extending outwardly from between the transparent panels to provide a flexible attaching flange for the unit, but said .015 inch thick layers lying entirely within the area of said glass sheets, and said panels having their edges entirely free from contact with the plastic of said interposed sheet.

JOSEPH D. RYAN.

REFERENCES CITED

The following references are of record in the file of this patent:

UNITED STATES PATENTS

| Number | Name | Date |
|---|---|---|
| 1,899,588 | Rohlfs | Feb. 28, 1923 |
| 2,032,663 | Neher | Mar. 3, 1936 |
| 2,113,767 | Paggi | Apr. 12, 1938 |
| 2,176,997 | Marini | Oct. 24, 1939 |
| 2,184,876 | Sherts | Dec. 26, 1939 |
| 2,303,151 | Watkins | Nov. 24, 1942 |

FOREIGN PATENTS

| Number | Country | Date |
|---|---|---|
| 365,828 | Great Britain | Jan. 28, 1932 |